UNITED STATES PATENT OFFICE.

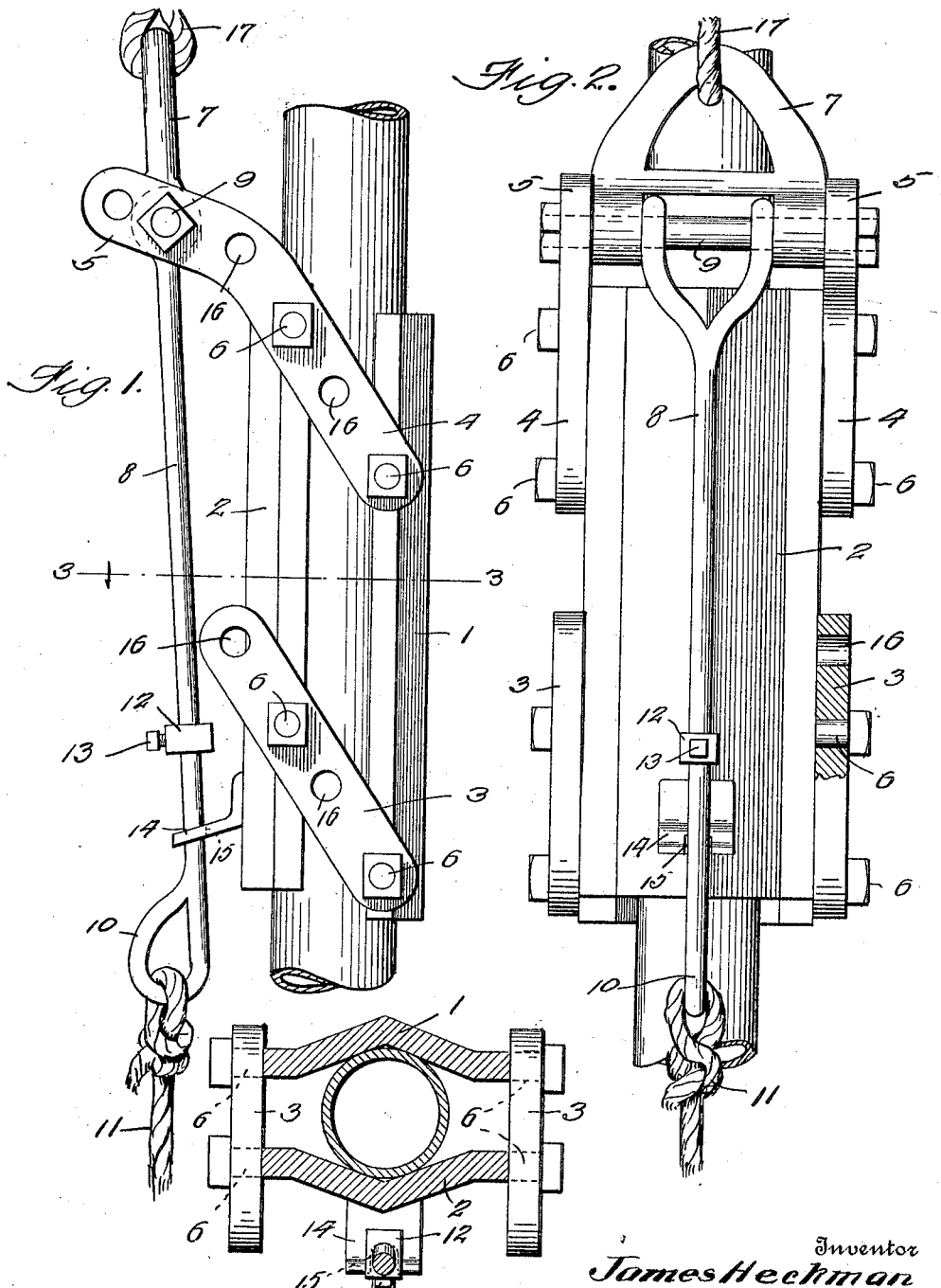

JAMES HECKMAN, OF CLARENDON, TEXAS.

PIPE-PULLER.

1,317,291.   Specification of Letters Patent.   Patented Sept. 30, 1919.

Application filed July 7, 1919. Serial No. 308,991.

*To all whom it may concern:*

Be it known that I, JAMES HECKMAN, a citizen of the United States, residing at Clarendon, in the county of Donley and State of Texas, have invented a new and useful Pipe-Puller, of which the following is a specification.

The object of my invention is to provide an improved pipepuller for pulling and letting casing, piping and sucker rods into a well, and which obviates all tower climbing to let pipe into the well, or to take the chain off from the pipe before putting sections together. I attain these and other objects of my invention by the mechanism illustrated in the accompanying drawings, in which—

Figure 1 is a side elevation of the invention applied to a pipe;

Fig. 2 is a side elevation of the device from a viewpoint at right angles to that from which Fig. 1 is viewed; and Fig. 3 is a horizontal section on line 3—3 of Fig. 1.

Like numerals designate like parts in each of the views.

Referring to the accompanying drawings, I provide opposed clamping plates 1 and 2, each having an obtusely V-shaped clamping face. Pivotally attached to plates 1 and 2 by suitable bolts 6 are adjustable arms 3 having a plurality of openings 16 to permit of adjustment for use with different sizes of pipe. As shown in Fig. 2, arms 4 are provided with extensions 5, through which passes bolt 9 on which is mounted clevis 7, and to which member is attached rope 17. I provide a rod 8 engaging bolt 9, said rod having at its free end a loop 10 to which is secured rope 11. Adjustably mounted on rod 8 is an adjustable catch nut 12, secured to the rod by setscrew 13. I further provide a block 14, fastened to plate 2 by means of a setscrew, or preferably by welding same to clamping plate 2. Block 14 is provided with a U-shaped opening 15, as indicated in Fig. 3.

In operating the invention, block and tackle are hooked to clevis 7. Rod 8 is employed to open the clamping plates by pulling downward on rope 11 so that the device can be pulled upward to engage the pipe farther up. Adjustable catch 12 may be moved behind block 14, through opening 15, and swung into position to abut against member 14 and fastened in such position by setscrew 13 when it is desired that the clamping plates 1 and 2 be held in a given outspread position, for holding the pipepuller open and disengage from the pipe while being pulled to the top of the pipe prior to being clamped thereto for the purpose of lowering the pipe into the well. The mode of adjusting the device will be obvious by referring to the accompanying drawings.

What I claim is:

1. In a device of the class described, the combination of opposed clamping plates adapted to engage a pipe, a plurality of arms pivotally attached to opposite ends of the plates, the upper arms having extensions, a bolt mounted in said extension, a clevis mounted on said bolt, a rod attached to the bolt, means for fastening a rope to the end of the bolt, and means for securing the rod in a desired adjusted position relative to the clamping plates whereby to hold the clamping plates in a desired adjusted relation.

2. In a device of the class described, the combination of opposed clamping plates, a plurality of arms adjustably pivoted to the plates and permitting of their being operated to engage and disengage pipes of various sizes, the upper arms having extended ends, a cross member mounted in said ends and carrying a clevis, a rod attached to the cross member and extending longitudinally of the plates, a block attached to one of the plates and having a U-shaped opening through which the rod passes, a block adjustably mounted on the rod, said block being of suitable size to engage behind the U-shaped opening in the block fastened to the plate, whereby to hold the clamping plates in a given position, substantially as described.

3. In a device of the class described, the combination of opposed clamping plates having gripping faces, grooved at an obtuse angle in cross section members pivotally connecting the clamping plates, means for forcing the clamping plates into position to grip a pipe there between, and means for retaining the plates in a desired adjusted position disengaged from the pipe, substantially as and for the purposes described.

JAMES HECKMAN.

Copies of this patent may be obtained for five cents each, by addressing the "Commissioner of Patents, Washington, D. C."